United States Patent [19]

Tsukada

[11] Patent Number: 5,774,238
[45] Date of Patent: Jun. 30, 1998

[54] COLOR CONVERSION FOR REALIZING COLOR REPRODUCTION WITHOUT USING COLOR REPRODUCTION MODEL

[75] Inventor: Masato Tsukada, Tokyo, Japan

[73] Assignee: NEC Corporation, Tokyo, Japan

[21] Appl. No.: 424,087

[22] Filed: Apr. 19, 1995

[30] Foreign Application Priority Data

Apr. 19, 1994 [JP] Japan .................................. 6-079088

[51] Int. Cl.$^6$ .................................................. H04N 1/29
[52] U.S. Cl. ........................................ 358/529; 358/518
[58] Field of Search .................................. 358/517–518, 358/529, 500, 504, 523; 395/109; 399/39

[56] References Cited

U.S. PATENT DOCUMENTS

| | | | |
|---|---|---|---|
| 4,500,919 | 2/1985 | Schreiber .................................. | 358/78 |
| 4,908,712 | 3/1990 | Uchiyama et al. ...................... | 358/529 |
| 5,077,604 | 12/1991 | Kivlowitz et al. ...................... | 358/524 |
| 5,398,121 | 3/1995 | Kowalewski et al. .................. | 358/504 |
| 5,638,183 | 6/1997 | Hayashi et al. ......................... | 395/109 |

FOREIGN PATENT DOCUMENTS 6-339016  12/1994  Japan .

OTHER PUBLICATIONS

Chiho Nakamura et al., "The Theory and Practice of Black Printer", *The Society Journal of Electrophotography of Japan*, vol. 29, No. 3, pp. 315–323, (1990).

Johji Tajima, *The Journal of The Institute of Image Electronics Engineers of Japan*, vol. 18, No. 1, pp. 20–28, (Feb. 1989).

Johji Tajima, *The Journal of The Institute of Image Electronics Engineers of Japan*, vol. 18, No. 2, pp. 44–48, (Apr. 1989).

Shinji Kita et al., "L*z*b* Based Flexible UCR For Both Of Text & Continuous Images", *Imaging Science & Technology*, pp. 55–58, (1992).

*Primary Examiner*—Edward L. Coles, Sr.
*Assistant Examiner*—Stephen Brinich
*Attorney, Agent, or Firm*—Foley & Lardner

[57] ABSTRACT

In reproducing an input RGB (red, green, and blue) color defined by particular tristimulus values by CMYK (cyan, magenta, yellow, and black) ink, color samples having a plurality of colors at controlled amounts of CMY (cyan, magenta, and yellow) with respect to a plurality of different amounts of K (black) ink are measured to be used as an original CMYK color reproduction zone. The original CMYK color reproduction zone is divided into individual CMYK color reproduction zones for each respective amount of the K ink. The individual CMYK color reproduction zones are memorized. All of the individual CMYK color reproduction zones are searched in response to the input RGB color defined by the particular tristimulus values to obtain at least one set of the amounts of the CMYK ink corresponding to the input RGB color. When a plurality of sets of the amounts of the CMYK ink are obtained, there sets are memorized as memorized sets of the amounts of the CMYK ink. Two sets of the amounts of the CMYK ink are selected from the memorized sets as selected sets of the amounts of the CMYK ink in accordance with a preselected K ink adjustment coefficient and interpolation is carried out using the K ink adjustment coefficient as a value of an interior division ratio to obtain a single set of the amounts of the CMYK ink corresponding to the input RGB color.

4 Claims, 9 Drawing Sheets

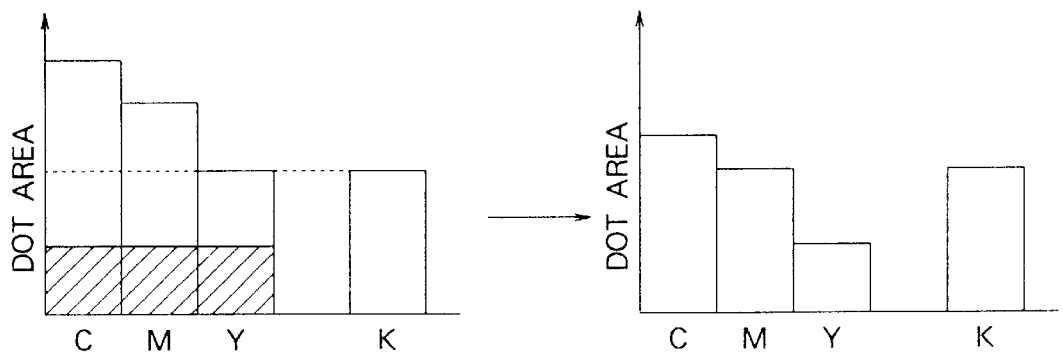
FIG. 1(a) UCR50%
PRIOR ART
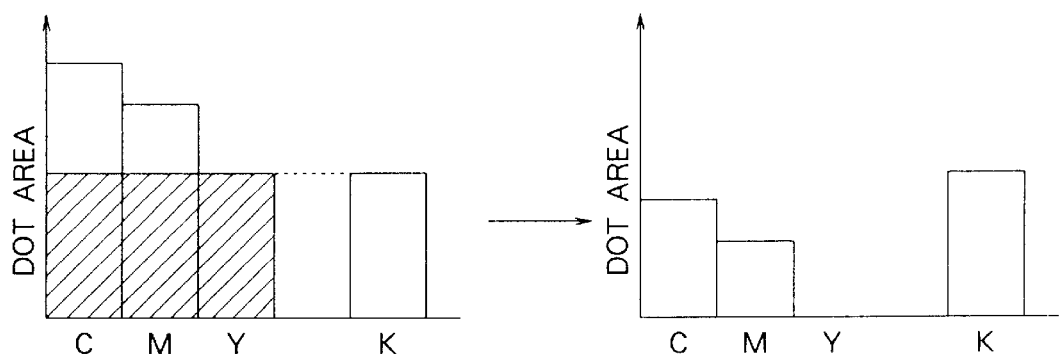
FIG. 1(b) UCR100%
PRIOR ART
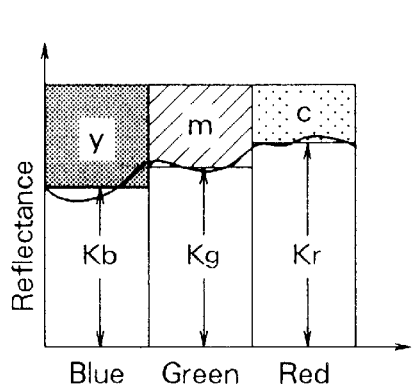
FIG. 2(a)
PRIOR ART
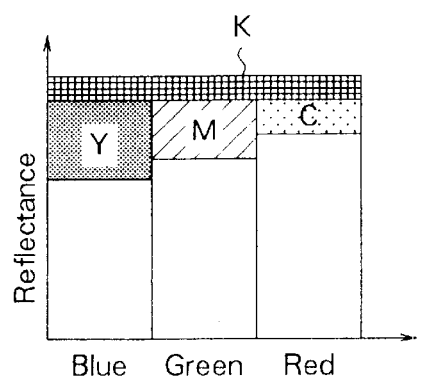
FIG. 2(b)
PRIOR ART

| | | | | | |
|---|---|---|---|---|---|
| $R_0$ | $G_0$ | $B_0$ | $X_{000}$ | $Y_{000}$ | $Z_{000}$ |
| $R_0$ | $G_0$ | $B_1$ | $X_{001}$ | $Y_{001}$ | $Z_{001}$ |
| $R_l$ | $G_m$ | $B_n$ | $X_{lmn}$ | $Y_{lmn}$ | $Z_{lmn}$ |

FIG. 5

| | | | | | | |
|---|---|---|---|---|---|---|
| $C_0$ | $M_0$ | $Y_0$ | $K_0$ | $X_{0000}$ | $Y_{0000}$ | $Z_{0000}$ |
| $C_0$ | $M_0$ | $Y_0$ | $K_1$ | $X_{0001}$ | $Y_{0001}$ | $Z_{0001}$ |
| $C_0$ | $M_0$ | $Y_0$ | $K_2$ | $X_{0002}$ | $Y_{0002}$ | $Z_{0002}$ |
| $C_l$ | $M_m$ | $Y_n$ | $K_p$ | $X_{lmnp}$ | $Y_{lmnp}$ | $Z_{lmnp}$ |

FIG. 6

PRINTER COLOR REPRODUCTION ZONE TABLE

| | | | | | | |
|---|---|---|---|---|---|---|
| $C_0$ | $M_0$ | $Y_0$ | $K_0$ | $X_{0000}$ | $Y_{0000}$ | $Z_{0000}$ |
| $C_0$ | $M_0$ | $Y_0$ | $K_1$ | $X_{0001}$ | $Y_{0001}$ | $Z_{0001}$ |
| $C_0$ | $M_0$ | $Y_0$ | $K_2$ | $X_{0002}$ | $Y_{0002}$ | $Z_{0002}$ |
| $C_l$ | $M_m$ | $Y_n$ | $K_p$ | $X_{lmnp}$ | $Y_{lmnp}$ | $Z_{lmnp}$ |

PRINTER COLOR REPRODUCTION ZONE TABLE AT $K_0$

| | | | | | |
|---|---|---|---|---|---|
| $C_0$ | $M_0$ | $Y_0$ | $X_{000}$ | $Y_{000}$ | $Z_{000}$ |
| $C_0$ | $M_0$ | $Y_1$ | $X_{001}$ | $Y_{001}$ | $Z_{001}$ |
| $C_0$ | $M_0$ | $Y_2$ | $X_{002}$ | $Y_{002}$ | $Z_{002}$ |
| $C_s$ | $M_t$ | $Y_u$ | $X_{stu}$ | $Y_{stu}$ | $Z_{stu}$ |

PRINTER COLOR REPRODUCTION ZONE TABLE AT $K_p$

| | | | | | |
|---|---|---|---|---|---|
| $C_0$ | $M_0$ | $Y_0$ | $X_{000}$ | $Y_{000}$ | $Z_{000}$ |
| $C_0$ | $M_0$ | $Y_1$ | $X_{001}$ | $Y_{001}$ | $Z_{001}$ |
| $C_0$ | $M_0$ | $Y_2$ | $X_{002}$ | $Y_{002}$ | $Z_{002}$ |
| $C_l$ | $M_m$ | $Y_n$ | $X_{lmn}$ | $Y_{lmn}$ | $Z_{lmn}$ |

FIG. 7

COLOR CONVERSION FOR REALIZING COLOR REPRODUCTION WITHOUT USING COLOR REPRODUCTION MODEL

BACKGROUND OF THE INVENTION

This invention relates to a color conversion method and a color conversion apparatus for converting an original color represented by a combination of three primary colors of light including red (R), green (G), and blue (B) into converted color represented by four colors of ink including cyan (C), magenta (M), yellow (Y), and black (K) to reproduce the original color by the use of the four colors of ink including cyan (C), magenta (M), yellow (Y), and black (K). The color conversion method and the color conversion apparatus are used in carrying out color reproduction between different types of color output devices, for example, between a display and a printer.

As known in the art, black (K) ink is used in addition to three colors (CMY) of ink in color reproduction of an original color represented by three primary colors (RGB) to thereby reduce the amounts of the three colors (CMY) of ink. Such technique of color reproduction is called an "under color removal (abbreviated to UCR)" process or algorithm. It is said that the UCR process has the following advantages.

(1) It is possible to facilitate control of the amounts of the three colors (CMY) of ink in an ink balance.

(2) It is possible to improve color reproducibility especially in a black area, as compared with a case where the three colors (CMY) of ink are exclusively used, and to thereby reproduce a delicate shadow portion.

(3) It is possible to replace a part of the expensive color ink by the inexpensive black ink.

Taking the above-mentioned advantages into consideration, color reproduction in color printing is generally carried out by the use of the four colors (CMYK) of ink including the black (K) ink.

However, the color reproduction by the four colors (CMYK) of ink encounters a problem of now to determine the amount of the black (K) ink having redundancy. That is, although only a single combination of the three colors (CMY) of ink provides, in color reproduction by the three colors (CMY) of ink, a reproduced color matching an original color of an original image, such a matching combination from the four colors (CMYK) of ink can not uniquely determined in color reproduction by the four colors (CMYK) of ink. In addition, a reproduced image sensitively varies in its appearance in dependence upon the amount of the black (K) ink when the amount of the black (K) ink is varied. Accordingly, it is desired to provide a technique which enables flexible determination of the amount of the black (K) ink.

As will later be described, any one of conventional color conversion methods can not easily realize color reproduction with high fidelity.

SUMMARY OF THE INVENTION

It is therefore an object of this invention to provide a color conversion method which can easily realize color reproduction with high fidelity.

It is another object of this invention to provide a color conversion method of the type described, which realizes color conversion from RGB into CMYK using real measurement data of color reproduction zones (or color gamuts) of a RGB color image display device and of a CMYK ink printing device without using a color reproduction model.

It is a further object of this invention to provide a color conversion apparatus which can easily realize color reproduction with high fidelity.

It is a still further object of this invention to provide a color conversion apparatus of the type described, which is supplied with real measurement data of color reproduction zones (or color gamuts) of an RGB color image display device and of a CMYK ink printing device for directly carrying out color conversion using the real measurement data of the color reproduction zones to thereby calculate an amount of K ink and amounts of CMY ink based on the real measurement data so that natural color reproduction is carried out in correspondence to display colors of the RGB color image display device.

Other objects of this invention will become clear as the description proceeds.

A color conversion method to which this invention is applicable is used in reproducing by CMYK (cyan, magenta, yellow, and black) ink an input color defined by particular tristimulus values.

According to this invention, the method comprises the steps of: measuring color samples having a plurality of colors at controlled amounts of CMY (cyan, magenta, and yellow) with respect to a plurality of different amounts of K (black) ink to obtain an original CMYK color reproduction zone by the CMYK ink; dividing the original CMYK color reproduction zone into individual CMYK color reproduction zones for every amounts of the K ink; memorizing said individual CMYK color reproduction zones for every amounts of the K ink; and searching all of the individual CMYK color reproduction zones for every amounts of the K ink in response to the input color defined by particular tristimulus values to obtain at least one set of the amounts of the CMYK ink corresponding to the input color defined by the particular tristimulus values.

A color conversion apparatus to which this invention is applicable is used in reproducing by CMYK (cyan, magenta, yellow, and black) ink an input color defined by particular tristimulus values.

According to this invention, the apparatus comprises: a color reproduction zone table representing an original CMYK color reproduction zone by the CMYK ink that is obtained by measuring color samples having a plurality of colors at controlled amounts of CMY (cyan, magenta, and yellow) with respect to a plurality of different amounts of K (black) ink; dividing memorizing means for dividing the original CMYK color reproduction zone into individual CMYK color reproduction zones for every amounts of the K ink; memorizing means for memorizing said individual CMYK color reproduction zones for every amounts of the K ink; and searching means for searching all of the individual CMYK color reproduction zones for every amounts of the K ink in response to the input color defined by particular tristimulus values to obtain at least one set of the amounts of the CMYK ink corresponding to the input color defined by the particular tristimulus values.

BRIEF DESCRIPTION OF THE DRAWING

FIGS. 1(a) and 1(b) are views describing a conventional UCR process when an UCR rate is equal to 50% and 100%, respectively;

FIGS. 2(a) and 2(b) are views describing a conventional color masking method in an isochromatic condition and in an UCR condition, respectively;

FIG. 5 shows a display color reproduction zone table used in this invention;

FIG. 6 shows a printer color reproduction zone table used in this invention;

FIG. 7 shows K ink dependent division of the printer color reproduction zone table of FIG. 6 for every amount of K in K;

DESCRIPTION OF THE PREFERRED EMBODIMENTS

Figure 3:
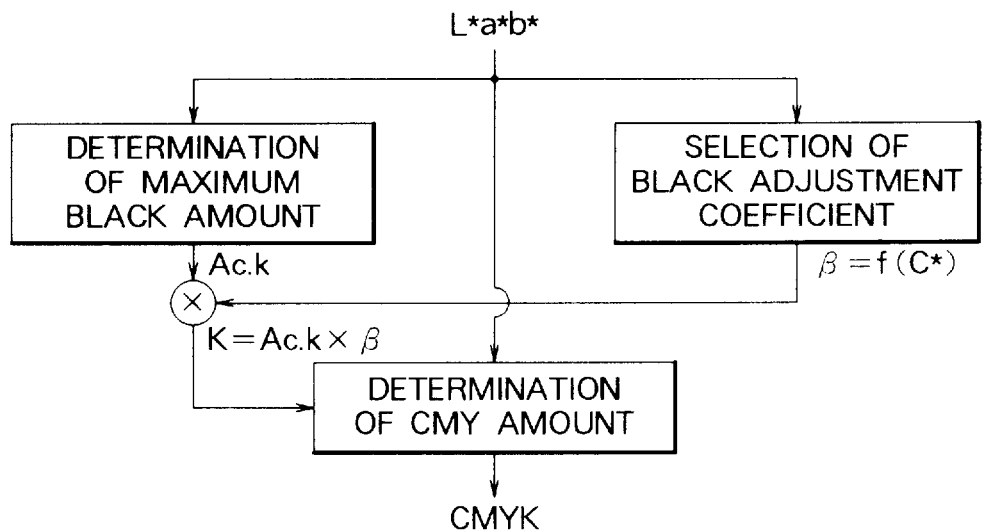
FIG. 3 is a block diagram of a conventional flexible UCR process by the use of I*a*b*.

Description will first be made as regards conventional color conversion methods. In order to carry out color reproduction by four colors (CMYK) of ink, use has generally been made of the above-mentioned UCR (under color removal) process and an "under color addition (abbreviated as UCA)" process which will later be described. In the UCR process, an overlapped portion where three colors (CMY) of ink are overlapped is replaced by the black (K) ink to thereby reduce the amounts of the three colors (CMY) of ink. The UCR process is disclosed, for example, in an article entitled "The Theory and Practice of Black Printer" written by C. Nakamura and M. Tamune, The Society Journal of Electrophotography of Japan, Vol. 29, No. 3, 1990.

FIGS. 1(a) and 1(b) show two cases where an UCR rate is equal to 50% and 100% with respect to the amount of the black (K) ink, respectively. When the UCR rate is equal to 100%, the amount corresponding to that of the black (K) ink is subtracted from the amount of each of the three colors (CMY) of ink. In the following description, the amounts of black, cyan, magenta, and yellow are represented by K, C, M, and Y, respectively. Likewise, the amounts of cyan, magenta, and yellow after they are subjected to the UCR process are depicted by C', M', and Y', respectively. In this event, the UCR process is represented by Equations (1):

$$K = P \times \min(C, M, Y), \ C' = C - UCR \times K, \ M' = M - UCR \times K, \text{ and } Y' = Y - UCR \times K, \quad (1)$$

where P represents a black rate, min(A, B, C) representing a minimum value selected from values of A, B, and C, UCR representing the UCR rate which is any real number between 0 and 1, both inclusive. However, if the UCR process is carried out at a high rate, a color saturation level is decreased at a portion rich in black (K) ink. Taking this into consideration, the UCR process is carried out at a low rate to prevent decrease of the color saturation level. Such UCR process is often called a low-rate UCR process. Practically, it is general that the UCR process is carried out at a rate between 30 and 40%.

In order to avoid a decrease in the color saturation level resulting from the UCR process, the three colors (CMY) of ink are again added after the UCR process is carried out. Such a technique is called the "under color addition (UCL)" process. Although it seems unreasonable to again add the three colors (CMY) of ink which have once been reduced, the UCR process is a concept developed from practical experience in order to suppress a color saturation level from being decreased due to the presence of the black (K) ink. No theory has yet been established which explicitly specifies the amounts of the three colors (CMY) of ink to be added.

For simplicity of description, the black ink, the three colors (CMY) of ink, and the four colors (CMYK) of ink will be referred to in the following description as the K ink, the CMY ink, and the CMYK ink, respectively.

The foregoing description has been directed to the UCR and the UCA processes applied to color conversion from RGB (red, green, blue) to CMY (cyan, magenta, yellow) and further to CMYK (cyan, magenta, yellow, black). In this case, the amounts of the CMY ink are determined first and the amount of the K ink is subsequently determined. On the other hand, based on the idea that the densities Dr, Dg, and Db of the three primary colors of an original image to be reproduced should be retained irrespective of presence or absence of the K ink, another technique is proposed in which the amounts of the CMY ink are calculated by a color masking method after the amount of the K ink is determined first. This technique is described in an article entitled "Color Masking (I)" and "Color Masking (II)" written by J. Tajima, The Journal of the Institute of Image Electronics Engineers of Japan, Vol. 18, No. 1, Feb. 1989 and Vol. 18, No. 2, Apr. 1989.

Referring to FIG. 2(a), a spectral reflectance of a particular object is depicted by a solid line. When the particular object is isochromatically represented by tristimulus values kr, kg, and kb, absorption by ideal colorants depicted by c, m, and y is sufficient. It is assumed here that the K ink has an ideal absorption index substantially constant throughout an entire wavelength band. In this event, an absorption pattern in FIG. 2(a) can be reproduced also when a part of the CMY ink is replaced by the K ink as illustrated in FIG. 2(b) (the UCR process). As will be understood from FIG. 2(b), the amount of the K ink may be selected at any desired value not greater than the smallest amount of absorption ink among cyan (C), magenta, (M), and yellow (Y) (C in FIG. 2(b)). In the above-mentioned color masking method, the amount of the CMY ink is given by Equation (2):

$$\begin{pmatrix} C \\ M \\ Y \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} Dr - K \\ Dg - K \\ Db - K \end{pmatrix} \quad (2)$$

$(0 \leq K \leq K\text{max}).$

For ideal ink, Kmax is given by Equation (3).

$$K\text{max} = \min(Dr, Dg, Db) \quad (3)$$

When color masking is carried out, post-UCR principal densities at the left side of Equation (2) possibly have negative values in dependence upon a level of $a_{ij}$. In this connection, Kmax is restricted by Equation (4).

$$K\max = \min\left(\frac{a_{11}Dr + a_{12}Dg + a_{13}Db}{a_{11} + a_{21} + a_{13}}, \frac{a_{21}Dr + a_{22}Dg + a_{23}Db}{a_{21} + a_{22} + a_{23}}, \frac{a_{31}Dr + a_{32}Dg + a_{33}Db}{a_{31} + a_{32} + a_{33}}\right) \quad (4)$$

The term K in Equation (2) is selected at any desired real number between O and Kmax. In accordance with the known skeleton black method which has widely been used, a black production threshold value Tk is determined and Equation (5) is given:

$$K = \begin{cases} 0 & (K\max \leq Tk) \\ K\max - Tk & (K\max > Tk) \end{cases} \quad (5)$$

Thus, a high-density gray part alone can be replaced by black. It is assumed in Equation (5) that Tk is infinitely large. In this event, K is always equal to zero. This means that printing is carried out by the CMY ink alone. When Tk is equal to zero, achromatic printing is carried out by a combination of the K ink and the other two colors of ink.

The UCR process and the color masking method described above rely upon the presumption that the absorbance of an overlapped portion where equal amounts of the CMY ink are overlapped is equivalent to that of the K ink of an equal amount. In practice, however, this presumption is not valid. Accordingly, the UCR process does not assure color reproducibility. In addition, it is difficult to obtain a specific combination of the amounts of the CMY ink that exhibits the absorbance equivalent to that of the K ink.

In order to realize color reproduction reflecting colorimetric (or color-measured) data, a flexible UCR process utilizes $L^*a^*b^*$ prescribed by CIE (International Commission on Illumination). This process is disclosed, for example, in an article written by S. Kita and H. Ogatsu and entitled "$L^*a^*b^*$ based Flexible UCR—1st Report" contributed to The 9th Joint Conference on Color Technology, 1992.

Referring to FIG. 3, a basic operation process in the flexible UCR process will be described hereunder. At first, in response to an $L^*a^*b^*$ signal, the maximum black amount (Ac,K) is determined on one hand and a black adjustment coefficient $\beta$ is given as a function f of a color saturation signal $C^*$ on the other hand. The amount of the K ink is determined by Equation (6):

$$K = Ac.K \times \beta \quad (6)$$

Figure 4:
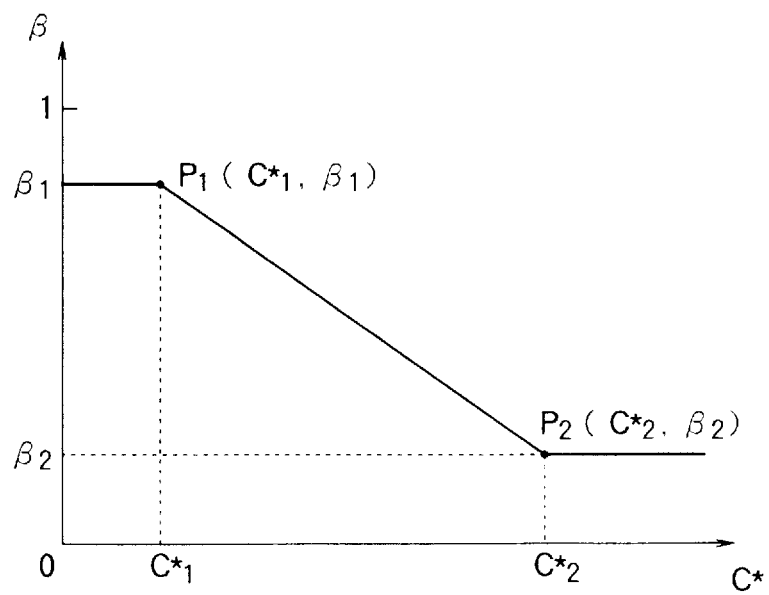
FIG. 4 shows a graph for describing determination of a black adjustment coefficient β in the conventional flexible UCR process by the use of L*a*b*.

The amounts of the CMY ink are calculated by the use of the $L^*a^*b^*$ signal and the amount of the K ink obtained by Equation (6). Herein, the black adjustment coefficient $\beta$ is obtained as a function illustrated in FIG. 4. For the color saturation signal $C^*$, first and second points P1 ($C^*1,\beta1$) and P2 ($^*2,\beta2$) are given. The black adjustment coefficient $\beta$ is selected in accordance with the conditions given below.

(1) When $C^* < C1^*$, $\beta = \beta1$.
(2) When $C1^* \leq C^* < C2^*$, $\beta = (\beta1-\beta2)/(C1^*-C2^*) \times (C^*-C1^*) + \oplus 1$.
(3) When $C2^* < C^*$, $\beta = \beta2$.

If $\beta1-\beta2=\beta0\neq1$, then skeleton black of the UCR rate of $\beta0$ is represented. If $\beta1=\beta2=1$, full black is represented. When $\beta1\neq\beta2$, new UCR reproduction is represented.

In the flexible UCR process, use is made of a black box type color reproduction model which is obtained in the following manner. Supplied with many different CMYK combinations, a printing system prints a number of color chips or patches to obtain CMYK colorimatric or color-measured data. A group of the CMYK colorimetric data and the $L^*a^*b^*$ signals corresponding thereto is estimated by a high-order polynomial. With the black box type color reproduction model described above, tristimulus values $T(L^*,a^*,b^*)$ are represented by Equation (7) by the use of a coefficient matrix A and a correction function $F(C,M,Y,K)$:

$$T = A \times F(C,M,Y,K) \quad (7)$$

To obtain C, M, Y, and K from $T(L^*a^*b^*)$, high-order simultaneous equations with four variables in Equation (7) must be solved.

A calculation step in the basic operation process illustrated in FIG. 3 is carried out in the manner which will presently be described.

1. Determination of the maximum black amount:

With respect to the $L^*a^*b^*$ signal, three sets (C, M, K), (C, Y, K), and (M, Y, K) of solutions are obtained on the assumption that any one of C, M, and Y in Equation (7) is equal to zero. When all of the three sets have positive values, the value of K is determined as the maximum black amount (Ac.K).

2. Selection of the black adjustment coefficient:

The parameters P1 and P2 are given. The black adjustment coefficient $\beta$ is calculated from the color saturation signal $C^*$ in accordance with the selecting conditions of the coefficient $\beta$. The amounts of the K ink is calculated by Equation (6).

3. Determination of the amounts of the CMY ink:

The amount of the K ink is fixed with respect to the $L^*a^*b^*$ signal. The amounts of the CMY ink are obtained by solving Equation (7).

In the flexible UCR process, the amount of the K ink is at first determined with respect to the amounts of the CMYK ink corresponding to the $L^*a^*b^*$ signal. Thereafter, nonlinear simultaneous equations in Equation (7) are solved to obtain the amounts of the CMY ink.

In order to carry out conversion from RGB to CMYK in a case where an original color defined by a combinations of three primary colors (RGB) of light is reproduced by the CMYK ink, the conventional UCR process relies upon the presumption that the absorbance of the overlapped portion where equal amounts of the CMY ink are overlapped is equivalent to that of the K ink of the equal amount. In practice, however, this presumption is invalid. It is therefore difficult to realize color reproduction with high fidelity. In order to solve this problem, it is necessary to measure a CMYK color reproduction zone (namely, a CMYK color gamut) and to carry out color conversion reflecting real measurement data thus obtained.

In the flexible UCR process, use is made of the black box type color reproduction model as described in the foregoing. Repeatedly speaking, the printer is supplied with many different CMYK combinations and prints a number of color patches to obtain CMYK colorimetric or color-measured data. With reference to the group of the CMYK colorimetric data and the $L^*a^*b^*$ signals corresponding thereto, the high-order equation representative of a correspondence function therebetween is estimated. Thus, this process relies upon the real measurement data. When the equation is obtained by measuring a sufficiently large number of color patches, valid solutions are obtained for those colors which can be printed by the printer. However, the color reproduction zone of the display is generally wider than that of the printer. This means that display colors displayed on the display contain a number of colors which can not be printed by the printer. In case of a particular display color which can not be printed by the printer, an excellent result of color reproduction is not assured according to the above-mentioned equation. Even if the real measurement data of the color reproduction zone are resorted to, excellent color reproduction can not be achieved unless an appropriate color conversion method (model) is used.

This invention realizes color conversion from RGB into CMYK reflecting real measurement data of color reproduction zones (namely, color gamuts) of an RGB color image display device and of a CMYK ink printing device without using a color reproduction model.

Furthermore, this invention provides an apparatus which is supplied with real measurement data of color reproduction zones (or color gamuts) of the RGB color image display device and of the CMYK ink printing device for directly carrying out color conversion with reference to the real measurement data of the color reproduction zones to thereby calculate an amount of K ink and amounts of CMY ink based on the real measurement data so that natural color reproduction is carried out in correspondence to display colors of the RGB color image display device.

Description will proceed to a principle of this invention. In the following description, a color image display system comprises an RGB trichromatic fluorescent display and a color image printing system comprises a CMYK printer.

Color reproduction zone tables describe color reproduction zones (namely, color gamuts) of the display and the printer, respectively, by the use of the XYZ color coordinate system prescribed by CIE. Although the gamut is essentially equivalent in meaning to the range of colors producible with a set of inks, lights, or other colorants, the gamut can conveniently be described in terms of a particular zone or region of a color space as defined in U.S. Pat. No. 4,500,919. It is assumed throughout the instant specification that the color gamut is equivalent in meaning to the particular zone (namely, the color reproduction zone) of the color space. Herein, the display color reproduction zone table describes XYZ values corresponding to display colors reproduced under control of RGB. The printer color reproduction zone table is obtained by measuring a plurality of color chips or patches printed under control of the amounts of CMYK ink.

FIGS. 5 and 6 show the display color reproduction zone table and the printer color reproduction zone table, respectively.

Generally, the color reproduction zone of the display is greater than that of the printer. In order to absorb a difference between the color reproduction zones of the display and the printer, color reproduction zone conversion (that is, color gamut mapping) is carried out on the color reproduction zone of the display. For this purpose, use may be made of an automatic color reproduction zone conversion method described in Japanese Unexamined Patent Publication No. 6-339016 (namely, 339016/1994) as well as other techniques. By the use of the automatic color reproduction zone conversion method, it is possible to automatically calculate a conversion parameter providing a minimum color difference in color reproduction zone conversion between the display and the printer by CMY ink and to calculate the amounts of the CMY ink corresponding to a display representative color. However, the method described in the above-mentioned Japanese Unexamined Patent Publication No. 6-339016 corresponds to the color reproduction zone of the printer by the CMY ink. An improved color conversion method adapted to the color reproduction zone of the printer by the CMYK ink in accordance with this invention is as follows.

Referring to FIG. 7, the printer color reproduction zone table is divided into individual color reproduction zone tables composed of the CMY ink with reference to the individual amounts of the K ink. The individual color reproduction zone tables are independently treated. Specifically, the printer color reproduction zone tables, p in number, at different amounts of the K ink are obtained from the printer color reproduction zone table with a level of the K ink set at a plurality of stages, p in number. The printer color reproduction zone tables, p in number, are entered as search objects in a searching operation of searching the printer color reproduction zones in the above-mentioned automatic color reproduction zone conversion method. As to the display representative color subjected to color reproduction zone conversion, the printer color reproduction zones, p in number, at the different amounts of the K ink are individually searched one by one of find those printer color reproduction zones where the color in question is present. Thus, corresponding ones of the printer color reproduction zones of the corresponding amounts of the K ink are obtained. Then, a calculation is made of the amounts of the K ink and the amounts of the CMY ink in the color reproduction zones in consideration. In this manner, at least one optimum amount of the CMYK ink corresponding to the display representative color is obtained.

In order to satisfy the condition where two or more sets of the amounts of the CMYK ink are obtained, the display representative color must be contained in a portion where two or more printer color reproduction zones including different amounts of the K ink are overlapped.

Figure 8:
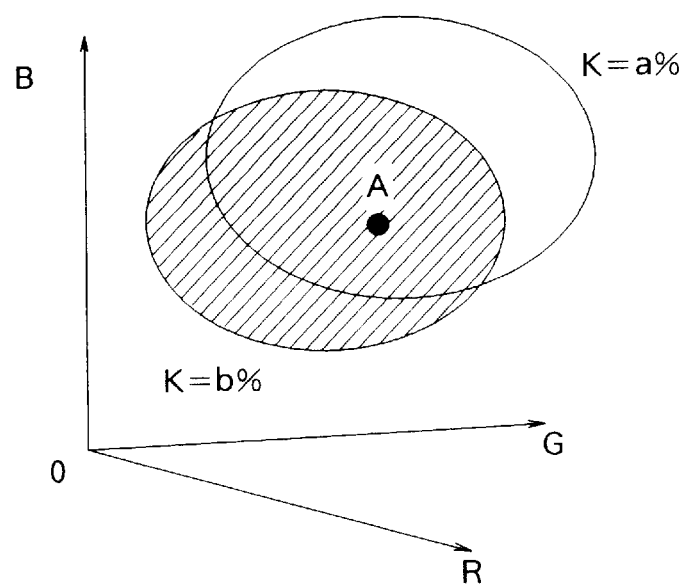
FIG. 8 shows, in order to describe operation of this invention, a condition in which a display representative color A is present in an overlapping portion where printer color reproduction zones at two different amounts of the K ink are overlapped.

Turning to FIG. 8, consideration will hereinafter be made as regards the case where a particular display representative color A in an RGB space is present in a portion where two printer color reproduction zones including different amounts of the K ink are overlapped. It is noted here that the optimum values of the CMYK ink corresponding to the display representative color A are obtained by the above-mentioned automatic color reproduction zone conversion method and that the amounts of the K ink have a relationship represented by b>a.

In FIG. 8, the input color A is present in two printer color reproduction zones where K is equal to be and where K is equal to a. Both of the amounts a and b of the K ink validly correspond to the display representative color A. The amounts of the CMY ink corresponding to the display representative color A in the printer color reproduction zone are represented by Ca, Ma, and Ya, respectively, when the amount of the K ink is equal to a. Likewise, the amounts of the CMY ink are represented by Cb, Mb, and Yb, respectively, when the amount of the K ink is equal to b. Theoretically, a reproduced color Aa by (Ca, Ma, Ya, a) and another reproduced color Ab by (Cb, Mb, Yb, and b) are approximately equivalent to each other.

In order to more flexibly determine the amount of the K ink with respect to the display representative color A, use is made of new values (C, M, Y, K) produced by using (Ca, Ma, Ya, a) and (Cb, Mb, Yb, b) obtained by an overall search of the printer color reproduction zones. With a K ink adjustment coefficient adk newly selected, the following calculation is carried out.

$$\begin{pmatrix} C \\ M \\ Y \\ K \end{pmatrix} = adk \times \begin{pmatrix} Cb \\ Mb \\ Yb \\ b \end{pmatrix} + (1 - adk) \times \begin{pmatrix} Ca \\ Ma \\ Ya \\ Ka \end{pmatrix} \quad (8)$$

Herein, the K ink adjustment coefficient adk is a real number between 0 and 1, both inclusive.

Figure 9:
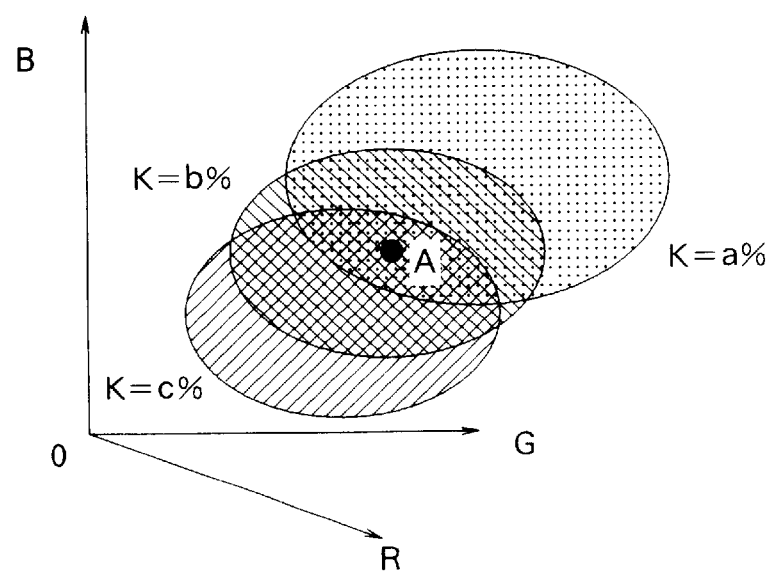
FIG. 9 shows, in order to describe another operation of this invention, a condition in which the display representative color A is present in an overlapping portion where printer color reproduction zones at three different amounts of the K ink are overlapped.

Turning to FIG. 9, consideration will hereinafter be made as regards the display representative color A is present in a portion where three printer color reproduction zones at different amounts of the K ink are overlapped. In this event, case sorting is made with respect to the values of the K ink adjustment coefficient adk. In response to the CMYK values obtained from adjacent printer gamuts, interpolation is carried out to calculate the CMYK value. It is assumed here that the three amounts a, b, and c of the K ink have a relationship represented by a<b<c and that the amounts a, b, and c of the K ink are selected so as to achieve distribution at a uniform interval throughout a uniform color space L*a*b*.

(1) When adk <0.5, then padk=adk×2.

$$\begin{pmatrix} C \\ M \\ Y \\ K \end{pmatrix} = padk \times \begin{pmatrix} Cb \\ Mb \\ Yb \\ b \end{pmatrix} + (1 - padk) \times \begin{pmatrix} Ca \\ Ma \\ Ya \\ a \end{pmatrix} \quad (9)$$

When adk ≦0.5, then padk=(adk−0.5)×2.

$$\begin{pmatrix} C \\ M \\ Y \\ K \end{pmatrix} = padk \times \begin{pmatrix} Cc \\ Mc \\ Yc \\ c \end{pmatrix} + (1 - padk) \times \begin{pmatrix} Cb \\ Mb \\ Yb \\ b \end{pmatrix} \quad (10)$$

If the input color A is present in a portion where four or more printer gamuts including different amounts of the K ink are overlapped, similar case sorting is carried out with respect to the values of the K ink adjustment coefficient adk. The value of padk is calculated and then the CMYK value is calculated.

Next, description will proceed to a method of selecting a color conversion table and a method of preparing a color conversion table corresponding to a new K ink adjustment coefficient according to this invention. It is assumed here that three color conversion tables are preliminarily prepared by the use of the K ink adjustment coefficients having values ss, tt, and uu. Herein, the values ss, tt, and uu are real numbers satisfying the condition represented by: 1≧ss>tt>uu>0. Upon calculation of the color conversion table corresponding to a new K ink adjustment coefficient X by the use of the three color conversion tables preliminarily given, case sorting is carried out in the following manner.

(1) When X=ss, one of the three color conversion tables at ss is selected as a color conversion table for X. The similar operation is carried out in case where X=tt or X=uu.

(2) When ss>X>tt, two of the three color conversion tables at ss and tt are selected. The amounts of the CMYK ink in the color conversion tables at ss and tt that correspond to the representative color signal are indicated as (Css, Mss, Yss, Kxx) and (Ctt, Mtt, Ytt, Ktt), respectively. The amounts (Cx, Mx, Yx, Kx) of the CMYK ink corresponding to the new K ink adjustment coefficient X are calculated by Equation (11) and stored in the color conversion table for X.

$$\begin{pmatrix} Cx \\ Mx \\ Yx \\ Kx \end{pmatrix} = pX \times \begin{pmatrix} Ctt \\ Mtt \\ Ytt \\ Ktt \end{pmatrix} + (1 - pX) \times \begin{pmatrix} Css \\ Mss \\ Yss \\ Kss \end{pmatrix}, \quad (11)$$

where pX=(X−tt)/(ss−tt).

(3) When tt>X>uu, two of the three color conversion tables at tt and uu are selected. The amounts of the CMYK ink in the color conversion tables at tt and uu that correspond to the representative color signal are indicated as (Ctt, Mtt, Ytt, Ktt) and (Cuu, Muu, Yuu, Kuu), respectively. The amounts of the CMYK ink (Xc, Mx, Yx, Kx) corresponding to the new K ink adjustment coefficient X is calculated by Equation (12) and stored in the color conversion table for X.

$$\begin{pmatrix} Cx \\ Mx \\ Yx \\ Kx \end{pmatrix} = pX \times \begin{pmatrix} Cuu \\ Muu \\ Yuu \\ Kuu \end{pmatrix} + (1 - pX) \times \begin{pmatrix} Ctt \\ Mtt \\ Ytt \\ Ktt \end{pmatrix} \quad (12)$$

where pX=(X−uu)/(tt−uu).

Figure 10:
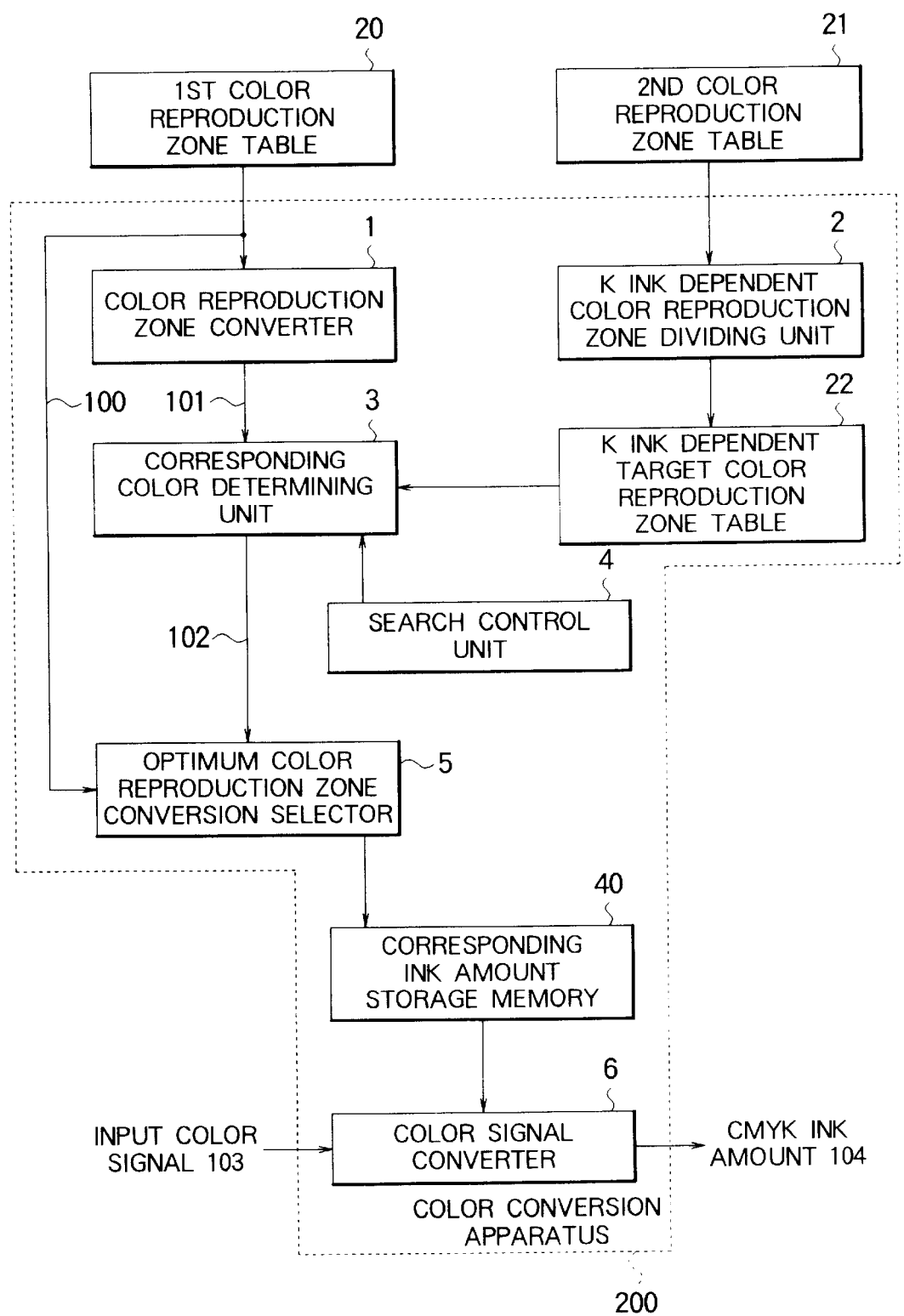
FIG. 10 is a block diagram describing a color conversion apparatus according to a first embodiment of this invention.

Turning to FIG. 10, description will proceed to a color conversion apparatus 200 according to a first embodiment of this invention. The color conversion apparatus 200 is supplied with a first color reproduction zone table 20 for a color image display device and a second color reproduction zone table 21 for a printing device using CMYK ink. In response to each original representative color signal 100 obtained from the first color reproduction zone table 20, a color reproduction zone converter 1 carries out color signal conversion at variable conversion parameters in color reproduction zone conversion to produce a conversion color signal 101 at each conversion parameter. A K ink dependent color reproduction zone dividing unit 2 is supplied with color reproduction zone data of the printing device composed of the CMYK ink and divides the color reproduction zone data for every amounts of the K ink into K ink dependent color reproduction zone data to be stored in a K ink dependent target color reproduction zone table 22. In order to obtain a set of the amounts 102 of the CMYK ink corresponding to the conversion color signal 101 by the use of a conventional technique, a corresponding color determining unit 3 searches the K ink dependent target color reproduction zone table 22 in the order designated by a search control unit 4. An optimum color reproduction zone conversion selector 5 selects an optimum conversion parameter providing a minimum total color difference among total color differences between the original representative color signal 100 and the amounts 102 of the CMYK ink corresponding to the conversion color signal 101 at the respective values of the conversion parameter. The original representative color signal 100 and a corresponding set of the amounts 102 of the CMYK ink thus obtained are stored in a corresponding ink amount storage memory 40. A color signal converter 55 calculates, by the use of interpolation or the like, the amounts of the CMYK ink corresponding to an input color signal 103 with reference to the corresponding ink amount storage memory 40 to produce a final CMYK ink amount set 104.

Figure 11:
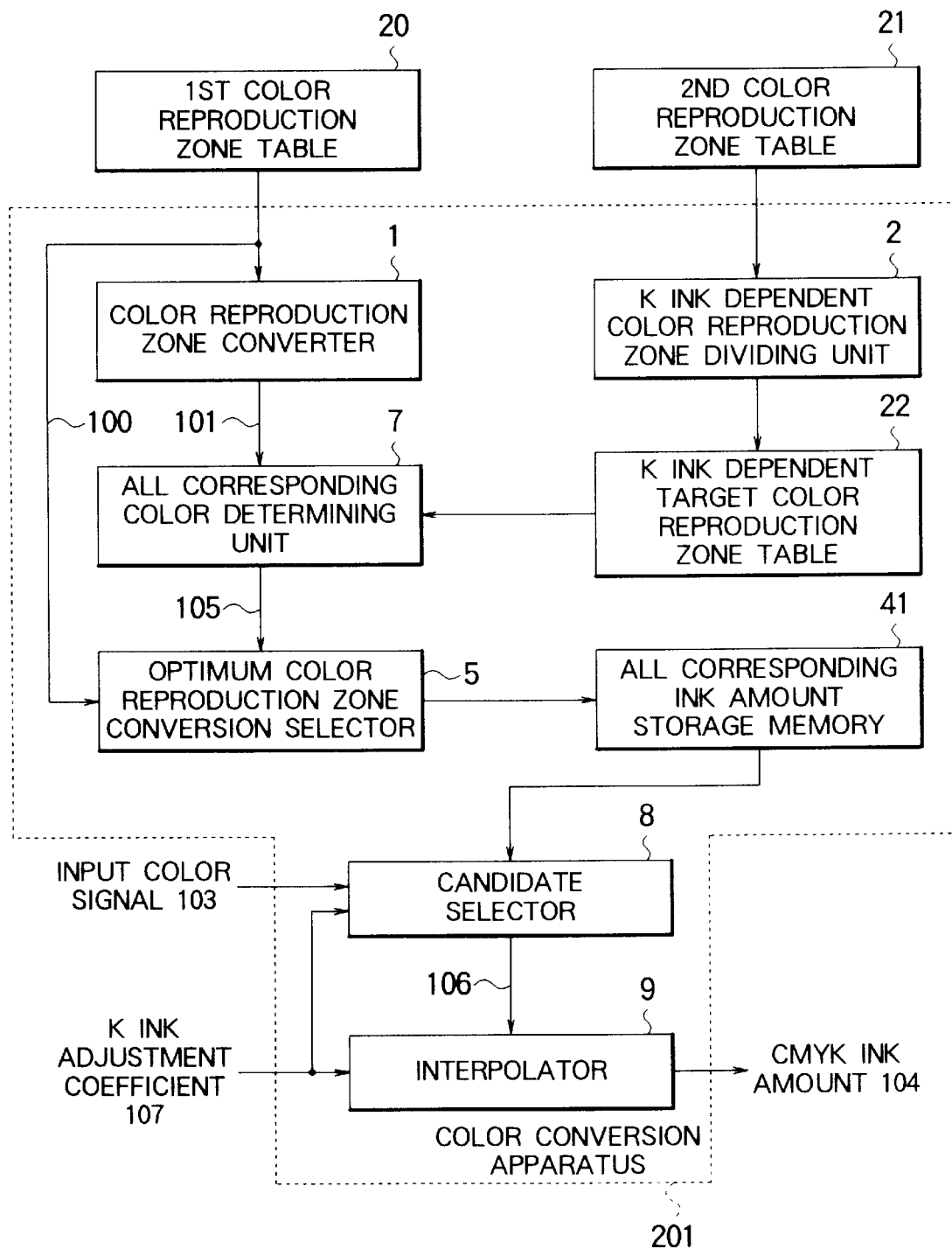
FIG. 11 is a black diagram describing a color conversion apparatus according to a second embodiment of this invention.

Turning to FIG. 11, a color conversion apparatus 201 according to a second embodiment of this invention is supplied with the first color reproduction zone table 20 for the color image display device and the second color reproduction zone table 21 for the printing device using the CMYK ink. In response to each original representative color signal 100 obtained from the first color reproduction zone table 20, the color reproduction zone converter 1 carries out color signal conversion at a variable conversion parameter in color reproduction zone conversion to produce the conversion color signal 101 at each conversion parameter. The K ink dependent color reproduction zone dividing unit 2 is supplied with color reproduction zone data of the printing device composed of the CMYK ink and divides the color reproduction zone data for every amounts of the K ink into K ink dependent color reproduction zone data to be stored in the K ink dependent target color reproduction zone table 22. An all corresponding color determining unit 7 searches the K ink dependent target color reproduction zone table 22 by the use of a conventional technique to obtain all CMYK ink amount sets 105 corresponding to the conversion color signal 101. The optimum color reproduction zone conversion selector 5 selects an optimum conversion parameter providing a minimum total color difference among total color differences between the original representative color signal 100 and the all CMYK ink amount sets 105 corresponding to the conversion color signal 101 at the respective values of the conversion parameter. The original representative color signal 100 and at least one of the all CMYK ink amount sets 105 thus obtained are stored in an all corresponding ink amount storage memory 41. In response to a K ink adjustment coefficient 107, a candidate selector 8 extracts from the all corresponding ink amount storage memory 41 one or two candidate CMYK ink amount sets 106 corresponding to the given input color signal 103 of the color image display device. When two candidate CMYK ink amount sets 106 are extracted for the input color signal 103, an interpolator 9 carries out interpolation in accordance with Equations (9) and (10) to produce the final CMYK ink amount set 104. When only one candidate CMYK ink amount set 106 is extracted for the input color signal 103, no interpolation is carried out and the candidate CMYK ink amount set 106 is straightforwardly produced as the final CMYK ink amount set 104.

Figure 12:
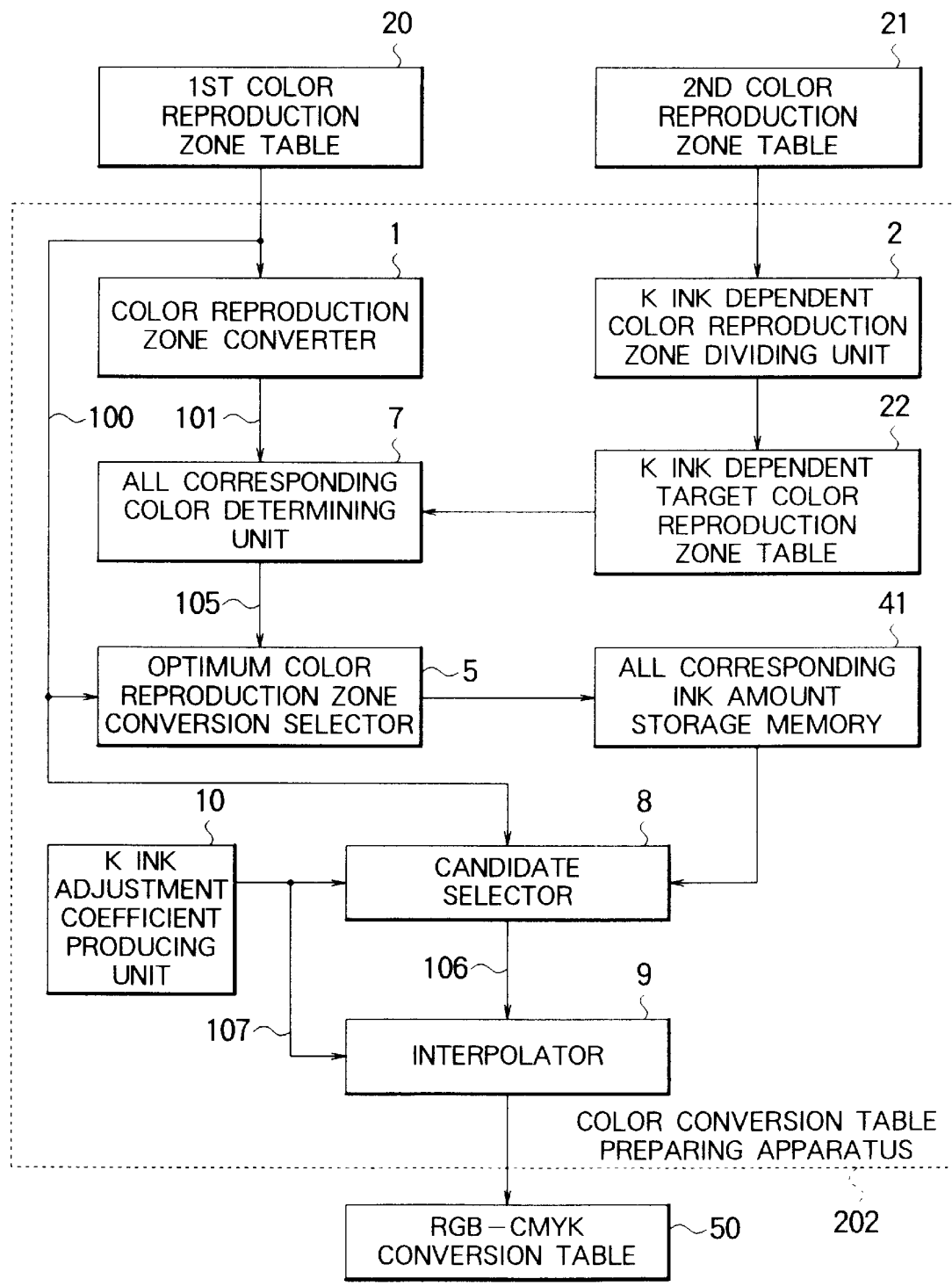
FIG. 12 is a block diagram describing a color conversion table preparing apparatus according to a third embodiment of this invention.

Turning to FIG. 12, a color conversion table preparing apparatus 202 according to a third embodiment of this invention is supplied with the first color reproduction zone table 20 for the color image display device and the second color reproduction zone table 21 for the printing device using the CMYK ink. In response to each original representative color signal 100 obtained from the first color reproduction zone table 20, the color reproduction zone converter 1 carries out color signal conversion at a variable conversion parameter in color reproduction zone conversion to produce the conversion color signal 101 for each conversion parameter. The K ink dependent color reproduction zone dividing unit 2 is supplied with color reproduction zone data of the printing device composed of the CMYK ink and divides the color reproduction zone data for every amounts of the K ink into K ink dependent color reproduction zone data to be stored in the K ink dependent target color reproduction zone table 22. The all corresponding color determining unit 7 searches the K ink dependent target color reproduction zone table 22 by the use of a conventional technique to obtain all CMYK ink amount sets 105 corresponding to the conversion color signal 101. The optimum color reproduction zone conversion selector 5 selects an optimum conversion parameter providing a minimum total color difference among total color differences between the original representative color signal 100 and the all CMYK ink amount sets 105 corresponding to the conversion color signal 101 at the respective values of the conversion parameter. The original representative color signal 100 and at least one of the all CMYK ink amount sets 105 ink thus obtained are stored in the all corresponding ink amount storage memory 41. In accordance with the K ink adjustment coefficient 107 produced by a K ink adjustment coefficient producing unit 10, the candidate selector 8 extracts from the all corresponding ink amount storage memory 41 one or two candidate CMYK ink amount sets 106 corresponding to every original representative color signal 100. When two candidate CMYK ink amount sets 106 are extracted in correspondence to the original representative color signal 100, the interpolar 9 carries out interpolation in accordance with Equations (9) and (10) to produce the final CMYK ink amount set. When only one candidate CMYK ink amount set 106 is extracted in correspondence to the original representative color signal 100, no interpolation is carried out and the candidate CMYK ink amount set 106 is stored in an RGB-CMYK conversion tale 50 as the final CMYK ink amount set.

Figure 13:
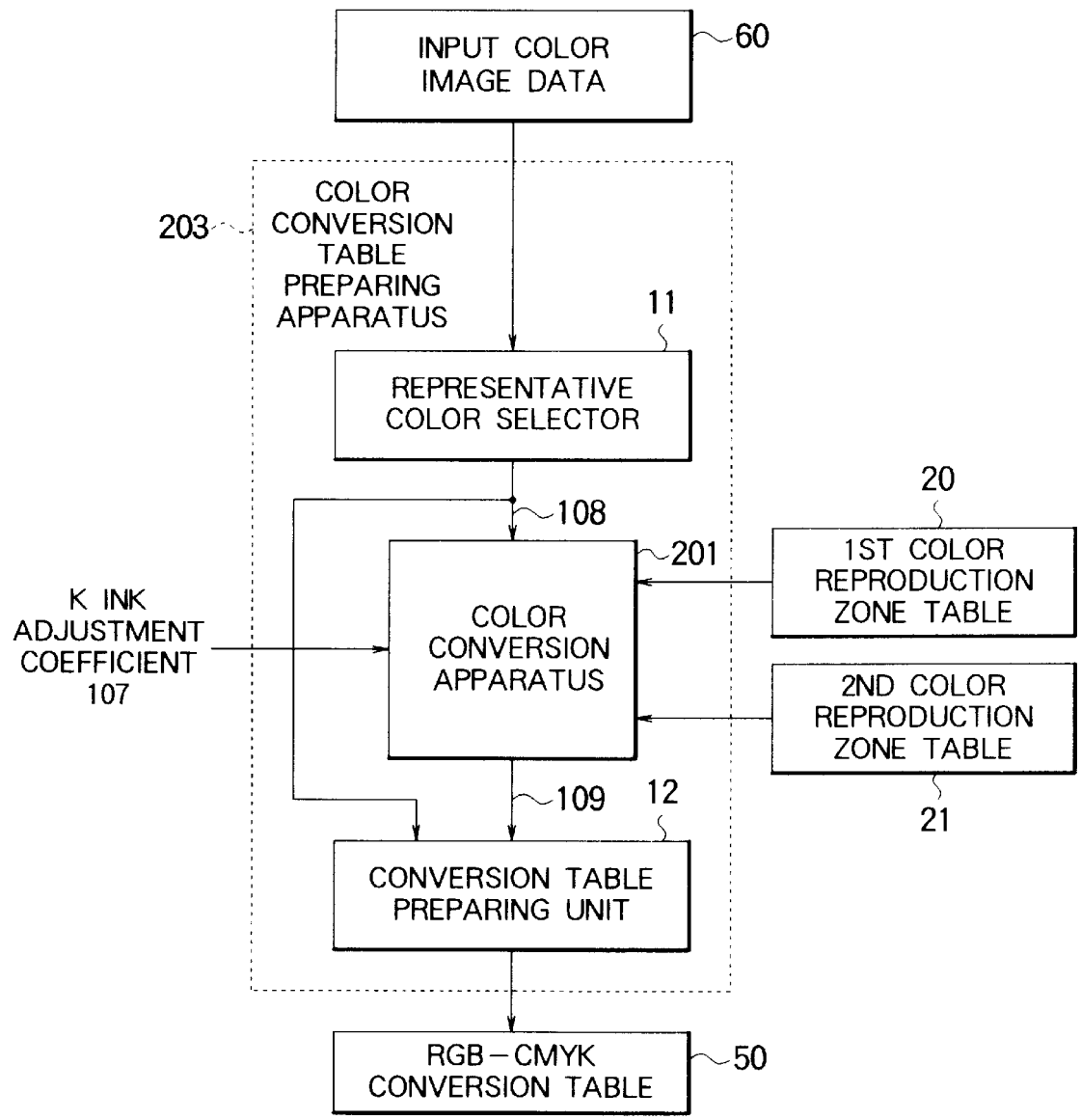
FIG. 13 is a block diagram describing a color conversion table preparing apparatus according to a fourth embodiment of this invention.

Turning to FIG. 13, a color conversion table preparing apparatus 202 according to a fourth embodiment of this invention is supplied with input color image data 60, the first color reproduction zone table 20 for the color image display device, the second color reproduction zone table 21 for the printing device by the CMYK ink, and the K ink adjustment coefficient 107. A representative color selector 11 calculates color distribution histograms of the input color image data 60 and selects a plurality of representative colors in the order from the most dominant one exhibiting the largest histogram to produce representative color signals 108. To achieve optimum color reproduction zone conversion between the color image display device and the printing device by the CMYK ink, the color conversion apparatus 201 carries out optimum color reproduction zone conversion upon each representative color signal 108 and calculates the amount of the CMYK ink corresponding thereto in accordance with Equations (9) and (10) by the use of the K ink adjustment coefficient 107 to produce a corresponding ink amount set 109. Supplied with the representative color signal 108 and the corresponding ink amount set 109 corresponding thereto, a conversion table preparing unit 12 prepares and produces the RGB-CMYK conversion table 50 matching the input color image.

Figure 14:
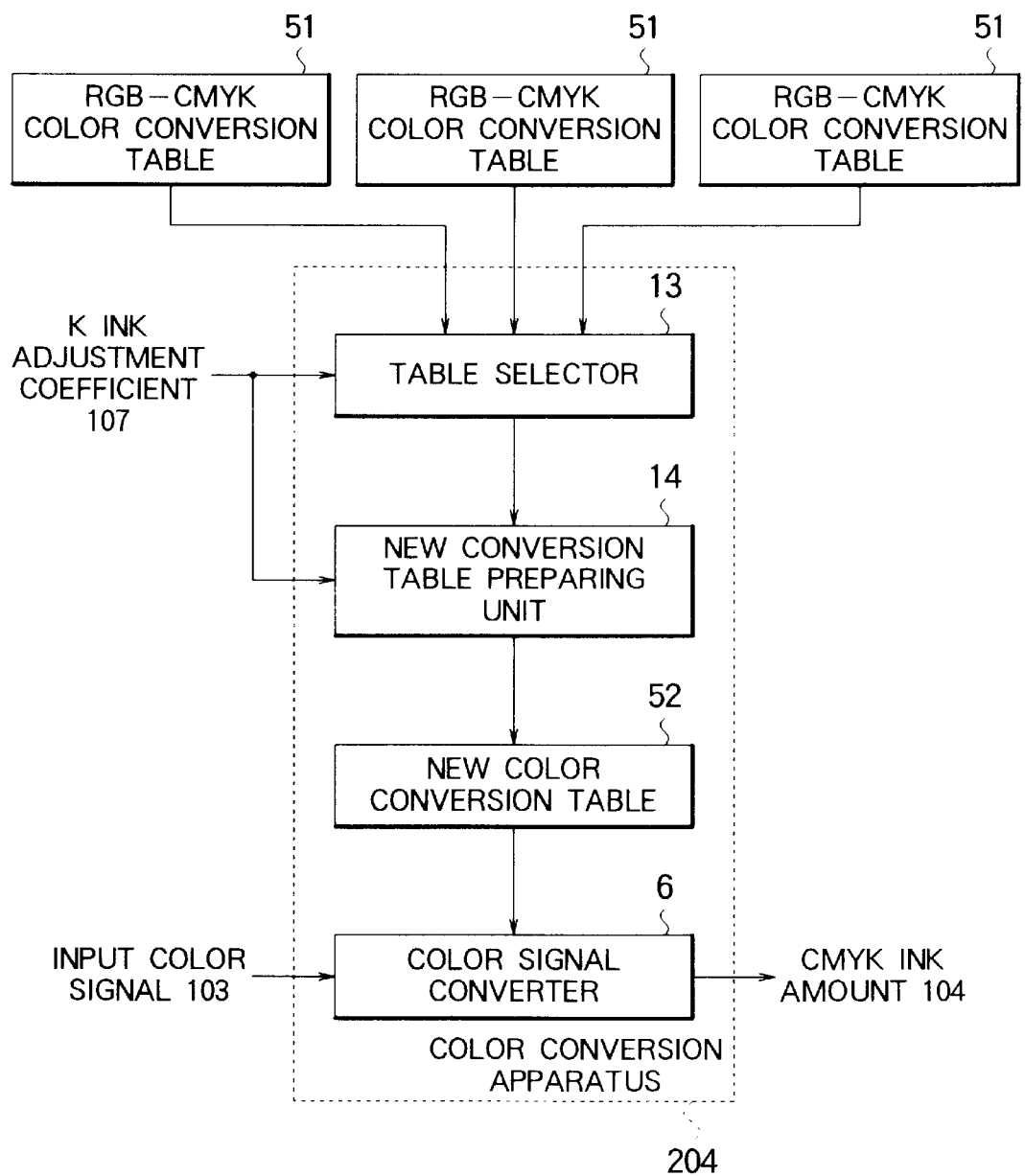
FIG. 14 is a block diagram describing a color conversion apparatus according to a fifth embodiment of this invention.

Turning to FIG. 14, a color conversion apparatus 204 according to fifth embodiment of this invention is supplied with a plurality of color conversion tables 51 preliminarily prepared by the above-mentioned color conversion table preparing apparatus 202 or 203 by the use of different K ink adjustment coefficients, and with the new K ink adjustment coefficient 107. In accordance with the new K ink adjustment coefficient 107, a table selector 13 selects one or two color conversion tables from the color conversion tables 51 preliminarily prepared by the use of the different K ink adjustment coefficients. Based on the color conversion table or tables selected by the table selector 13, a conversion table preparing unit 14 prepares a new color conversion table 52 corresponding to the K ink adjustment coefficient 107 in accordance with Equation (11) or (12). A color signal converter 6 calculates the amounts of the CMYK ink corresponding to the input color signal 103 by the use of interpolation or the like with reference to the new color conversion table 52 to produce the final CMYK ink amount set 104.

As described above, when the real color reproduction zones of the original image or the color image display device and the printing device by the CMYK ink are given in the form of the tables, it is possible according to this invention to directly determine the amounts of the CMYK ink corresponding to a desired color on the color image display device with reference to the real measurement data. Upon determination of the amounts of the CMYK ink corresponding to the desired color, the amount of the K ink is flexibly selected by the use of the K ink adjustment coefficient and the amounts of the CMY ink at each amount of the K ink can be obtained. Flexible selection of the amount of the K ink enables fine adjustment of the appearance of the image.

What is claimed is:

1. A color conversion method for reproducing, without using a UCR (under color removal) algorithm, an input color defined by particular tristimulus values by CMYK (cyan, magenta, yellow, and black) ink, said method comprising the steps of:

measuring color samples having a plurality of colors at controlled amounts of CMY (cyan, magenta, and yellow) with respect to a plurality of different amounts of K (black) ink to obtain an original CMYK color reproduction zone by said CMYK ink;

dividing said original CMYK color reproduction zone into individual CMYK color reproduction zones for each respective amount of said K ink;

memorizing said individual CMYK color reproduction zones; and searching all of said individual CMYK color reproduction zones in response to said input color defined by said particular tristimulus values to obtain at least one set of the amounts of said CMYK ink corresponding to said input color defined by said particularly tristimulus values, wherein said at least one set of the amounts of said CMYK ink includes a plurality of sets of the amounts of said CMYK ink, and wherein said method further comprises the steps of:

memorizing said plurality of sets of the amounts of said CMYK ink as memorized sets of the amounts of said CMYK ink;

selecting from said memorized sets of the amounts of said CMYK ink, as selected sets of the amounts of said CMYK ink, two sets of said amounts of said CMYK ink in accordance with a preselected K ink adjustment coefficient; and carrying out interpolation by using said K ink adjustment coefficient as a value of an interior division ratio to obtain a single set of said amounts of the CMYK ink corresponding to said input color defined by said particular tristimulus values.

2. A color conversion method as claimed in claim 1, wherein said input color is an input RGB (red, green, and blue) color defined by said particular tristimulus values.

3. A color conversion apparatus for reproducing, without using a UCR (under color removal) algorithm, an input color defined by particular tristimulus values by CMYK (cyan, magenta, yellow, and black) ink, said apparatus comprising:

a color reproduction zone table representing an original CMYK color reproduction zone by said CMYK ink that is obtained by measuring color samples having a plurality of colors at controlled amounts of CMY (cyan, magenta, and yellow) with respect to a plurality of different amounts of K (black) ink;

dividing means for dividing said original CMYK color reproduction zone into individual CMYK color reproduction zones for respective amounts of said plurality of different amounts of said K ink;

zone memorizing means for memorizing said individual CMYK color reproduction zones; and searching means for searching all of said individual CMYK color reproduction zones in response to said input color defined by said particular tristimulus values to obtain at least one set of the amounts of said CMYK ink corresponding to said input color defined by said particular tristimulus values, wherein said at least one set of the amounts of said CMYK ink includes a plurality of sets of the amounts of said CMYK ink, and wherein said apparatus further comprises:

set memorizing means for memorizing said plurality of sets of the amounts of said CMYK ink as memorized sets of the amounts of said CMYK ink;

selecting means for selecting from said memorized sets of the amounts of said CMYK ink, as selected sets of the amounts of said CMYK ink, two sets of said amounts of said CMYK ink in accordance with a preselected K ink adjustment coefficient; and interpolating means for carrying out an interpolation by using said K ink adjustment coefficient as a value of an interior division ratio to obtain a single set of said amounts of the CMYK ink corresponding to said input color defined by said particular tristimulus values.

4. A color conversion apparatus as claimed in claim 3, wherein said input color is an input RGB (red, green, and blue) color defined by said particular tristimulus values.

* * * * *